(12) United States Patent
Pellenz et al.

(10) Patent No.: US 8,608,241 B2
(45) Date of Patent: Dec. 17, 2013

(54) VEHICLE SEAT

(75) Inventors: Wolfgang Pellenz, Meckenheim (DE);
Sachin Bharambe, Pune (IN); Vikas Wayal, Leverkusen (DE); Christian Huebsch, Duesseldorf (DE); Robin Ndagijimana, Neuss (DE); Silvio Hartlaub, Pulheim Sinnersdorf (DE)

(73) Assignee: Johnson Controls Technology Company, Holland, MI (US)

( * ) Notice: Subject to any disclaimer, the term of this patent is extended or adjusted under 35 U.S.C. 154(b) by 506 days.

(21) Appl. No.: 12/674,266

(22) PCT Filed: Aug. 22, 2008

(86) PCT No.: PCT/EP2008/006926
§ 371 (c)(1),
(2), (4) Date: Apr. 19, 2011

(87) PCT Pub. No.: WO2009/024354
PCT Pub. Date: Feb. 26, 2009

(65) Prior Publication Data
US 2011/0241392 A1 Oct. 6, 2011

(30) Foreign Application Priority Data

Aug. 22, 2007 (DE) .......................... 10 2007 039 740
Jan. 28, 2008 (DE) .......................... 10 2008 006 412

(51) Int. Cl.
*B60N 2/427* (2006.01)
*B60R 21/055* (2006.01)

(52) U.S. Cl.
USPC .................................................. 297/216.12

(58) Field of Classification Search
USPC ..................................................... 297/216.12
See application file for complete search history.

(56) References Cited

U.S. PATENT DOCUMENTS

| 5,377,554 | A | | 1/1995 | Reulein et al. |
| 5,882,071 | A | * | 3/1999 | Fohl .......................... 297/216.12 |
| 6,273,511 | B1 | * | 8/2001 | Wieclawski ......... 297/216.12 X |
| 6,340,206 | B1 | * | 1/2002 | Andersson et al. .. 297/216.12 X |
| 6,354,659 | B1 | * | 3/2002 | Andersson et al. .. 297/216.12 X |
| 6,474,733 | B1 | * | 11/2002 | Heilig et al. ............. 297/216.12 |
| 6,550,856 | B1 | * | 4/2003 | Ganser et al. ........ 297/216.12 X |

(Continued)

FOREIGN PATENT DOCUMENTS

DE 100 41 529 A1 3/2002
DE 101 13 091 A1 10/2002

(Continued)

OTHER PUBLICATIONS

International Search Report for application No. PCT/EP2008/006926 mailed Jun. 12, 2009.

(Continued)

*Primary Examiner* — Rodney B White
(74) *Attorney, Agent, or Firm* — Fletcher Yoder P.C.

(57) ABSTRACT

A vehicle seat comprises a backrest, an active headrest, a release device, and an energy store. During normal operating situations of the vehicle seat the energy store is blocked. During an accident, particularly a rear-end accident, the energy store is released for actuation of the active headrest. The energy store is arranged in the active headrest or in the backrest. The backrest includes an actuating device, and a transmission device is arranged between the actuating device and the active headrest.

10 Claims, 2 Drawing Sheets

(56) References Cited

U.S. PATENT DOCUMENTS

| | | | |
|---|---|---|---|
| 6,572,186 B1 * | 6/2003 | Fischer et al. | 297/216.12 |
| 6,719,368 B1 * | 4/2004 | Neale | 297/216.12 X |
| 6,805,411 B2 * | 10/2004 | Gramss et al. | 297/216.12 X |
| 6,824,212 B2 * | 11/2004 | Malsch et al. | 297/216.12 |
| 7,073,856 B2 * | 7/2006 | Akaike et al. | 297/216.12 |
| 7,374,239 B1 * | 5/2008 | Jayasuriya et al. | 297/216.12 |
| 7,484,796 B2 * | 2/2009 | Fischer et al. | 297/216.12 |
| 7,556,313 B2 * | 7/2009 | Browne et al. | 297/216.12 |
| 7,597,391 B2 * | 10/2009 | Jayasuriya et al. | 297/216.12 |
| 7,641,280 B2 * | 1/2010 | Uno et al. | 297/216.12 |
| 7,963,598 B2 * | 6/2011 | Akaike et al. | 297/216.12 |
| 7,992,932 B2 * | 8/2011 | Hartlaub | 297/216.12 |
| 8,029,055 B2 * | 10/2011 | Hartlaub | 297/216.12 |
| 8,141,945 B2 * | 3/2012 | Akaike et al. | 297/216.12 |
| 2001/0040396 A1 * | 11/2001 | Kreuels et al. | 297/216.12 |
| 2003/0160481 A1 * | 8/2003 | Veine et al. | 297/216.12 |
| 2004/0075312 A1 * | 4/2004 | Neale | 297/216.12 |
| 2006/0006709 A1 * | 1/2006 | Uno et al. | 297/216.12 |
| 2007/0096514 A1 * | 5/2007 | Haglund et al. | 297/216.12 |
| 2007/0262631 A1 | 11/2007 | Hartlaub | |
| 2008/0136240 A1 | 6/2008 | Matthews et al. | |
| 2008/0272631 A1 | 11/2008 | Hartlaub | |
| 2009/0001785 A1 * | 1/2009 | Swan et al. | 297/216.12 |
| 2009/0322127 A1 * | 12/2009 | Michalak et al. | 297/216.12 |
| 2010/0320816 A1 * | 12/2010 | Michalak | 297/216.12 |

FOREIGN PATENT DOCUMENTS

| | | |
|---|---|---|
| DE | 102005021482 | 11/2006 |
| EP | 0491744 A1 | 7/1992 |
| EP | 1 167 116 A1 | 1/2002 |
| JP | 2005016304 | 1/2005 |
| JP | 2005095237 | 4/2005 |
| WO | 2006037801 | 4/2006 |

OTHER PUBLICATIONS

Japanese Exam Report dated Mar. 19, 2013.

* cited by examiner

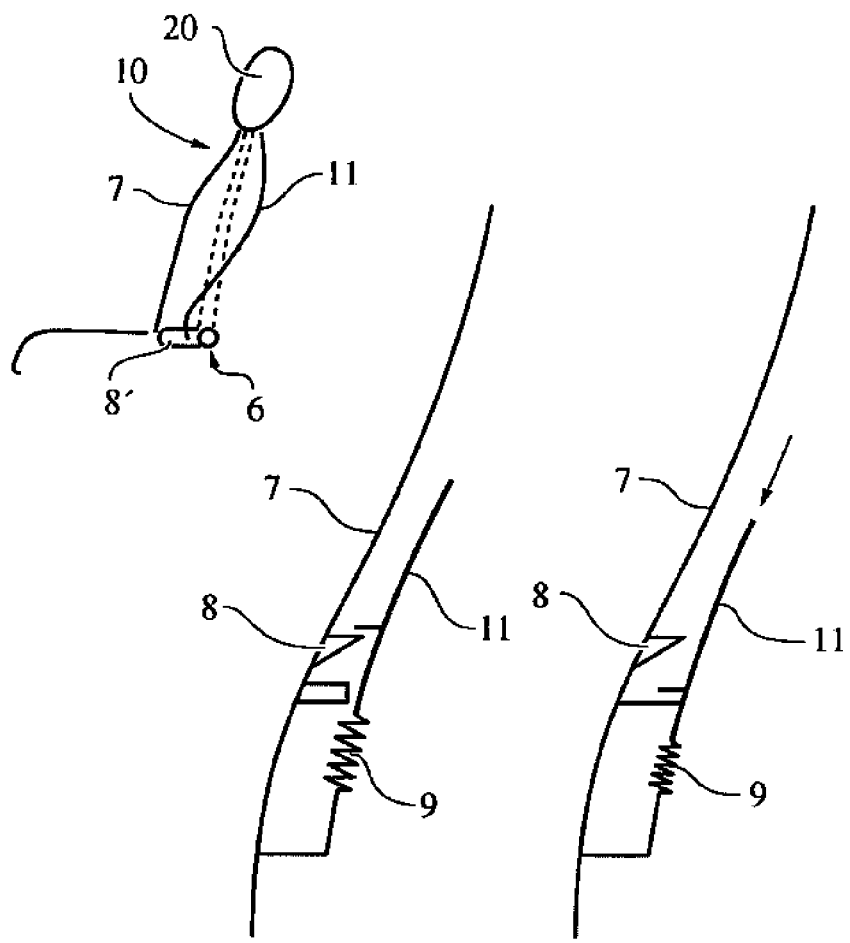
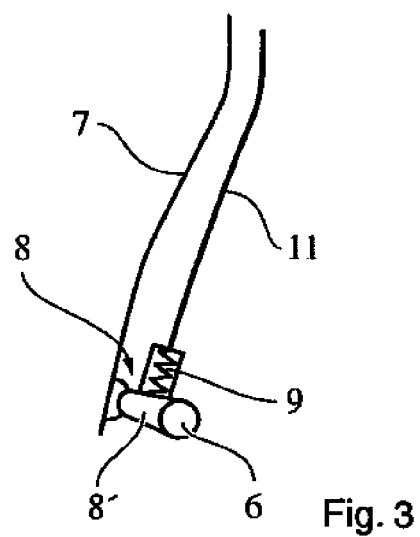
Fig. 1   Fig. 2
Fig. 3

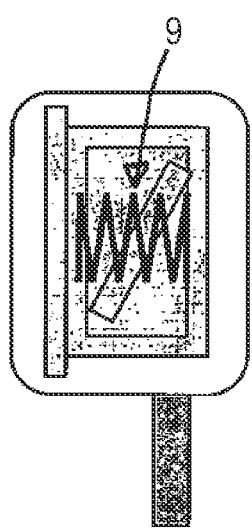
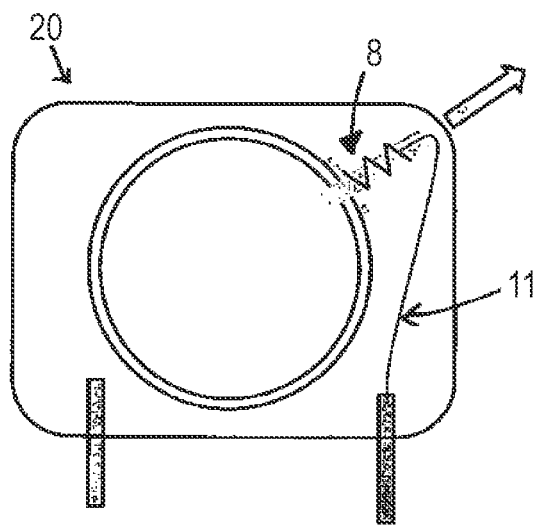
FIG. 4  FIG. 5
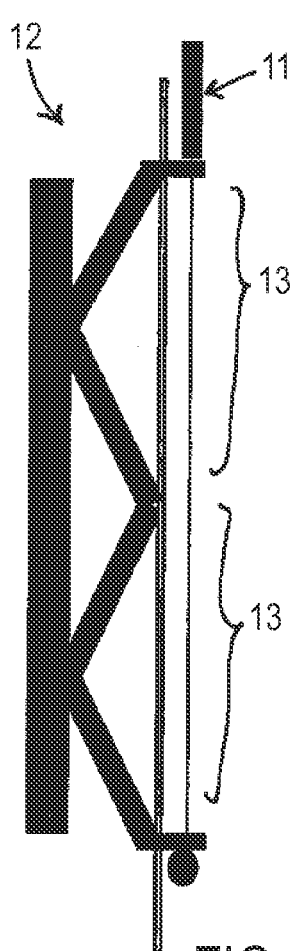
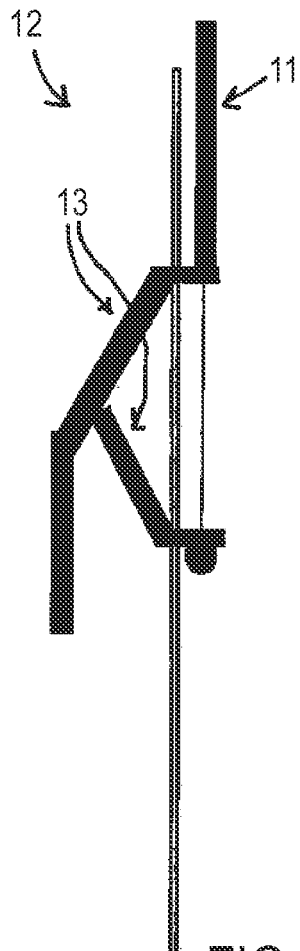
FIG. 6  FIG. 7

VEHICLE SEAT

CROSS REFERENCE TO RELATED APPLICATIONS

This application claims priority from and the benefit of PCT Application No. PCT/EP2008/006926, filed on Aug. 22, 2008; German Patent No. DE 10 2007 039 740.4, filed on Aug. 22, 2007; and German Patent DE 10 2008 006 412.2, filed on Jan. 28, 2008; all entitled "Vehicle Seat", which are herein incorporated by reference.

BACKGROUND

The invention relates to a vehicle seat, in particular for a motor vehicle, with a seat part and a backrest.

The present invention is based on a vehicle seat with a backrest and an active headrest, the vehicle seat comprising a release device and an energy store, during a normal operating situation of the vehicle seat, blocking of the energy store being provided, during an accident a release of the energy store being provided, and by means of the release of the energy store the actuation of the active headrest being provided. Furthermore, the present invention is based on a vehicle seat which is disclosed in the German patent application DE 10 2005 021 482 A1. Reference is expressly made to the disclosure in this patent application which forms the subject-matter of this patent application.

So-called active headrests are generally known. For the actuation thereof, it is known to provide operating devices and/or actuating devices in the lower part of the backrest of a seat provided with such an active headrest.

SUMMARY

The object of the invention is to provide a vehicle seat with a backrest and with an active headrest, so that maximum safety may be combined with a relatively simple and cost-effective design of the vehicle seat. Moreover, the object of the invention is to provide a vehicle seat comprising a backrest with a particularly low overall depth, without the comfort being impaired relative to conventional vehicle seats, and at the same time to provide a high degree of passenger safety, in particular in the event of so-called rear accidents or rear crashes, where active headrests are used.

The object is achieved according to a first embodiment by a vehicle seat with a backrest and an active headrest, the vehicle seat comprising a release device and an energy store, during a normal operating situation of the vehicle seat, blocking of the energy store being provided, during an accident a release of the energy store being provided, by means of the release of the energy store the actuation of the active headrest being provided, the energy store being arranged in the active headrest or in the backrest, the backrest comprising an actuating device and a transmission device being arranged between the actuating device and the active headrest. As a result, it is advantageously possible according to the invention that an actuation of the active headrest, which is purely triggered by the body and thus mechanically, may be implemented by means of the actuating device (for the detection of a relative movement between the occupant and the structure of the vehicle seat in the event of a rear accident), on the one hand, and the release device (for releasing and/or freeing the energy of the energy store), on the other hand. In this connection, relative to an implementation of an active headrest triggered by a sensor and based on the processing of electrical signals, costly components may advantageously be dispensed with, such as a pyrotechnic or electromagnetic release device for releasing the energy store, and a connection to an electronic control unit may be avoided. Also, a possibility for resetting the active headrest may be implemented in a relatively simple manner. Furthermore, relative to an implementation of an active headrest which is purely driven by the body, firstly a more rapid release and/or more rapid adjustment of the safety position may be advantageously implemented and it may secondly be provided that the design of the actuating device in the backrest is simpler and slimmer as, for simply producing a release force, requirements for the actuating device are set which are lower in terms of structure and stability.

According to the invention it is preferred, in particular in the first embodiment, that the actuating device is an articulated lever arrangement provided for actuating the transmission device and/or that the actuating device is an articulated lever arrangement comprising two pairs of articulated levers. As a result, the actuating device may be constructed to be particularly simple, cost-effective, lightweight and slim, and nevertheless generate a sufficiently large actuating path (for example of a Bowden cable and/or generally of a transmission device) for releasing the release device and releasing the energy store. Moreover, in particular in the first embodiment of the invention, it is also preferred that the energy store and the release device are arranged in the headrest. As a result, a compact design of the entire system of the active headrest is advantageously implemented, only the actuating device being provided, in particular, in the lower region of the backrest and being connected to the active headrest by means of a transmission device and/or a Bowden cable.

The object is further achieved according to a second embodiment by a vehicle seat with a backrest, the backrest comprising a shell structure, the backrest comprising a release device and an energy store, during a normal operating situation of the vehicle seat, blocking of the energy store being provided, during an accident a release of the energy store being provided, and by means of the release of the energy store the actuation of an active headrest being provided. As a result, an actuation of an active headrest may take place by simple means in an accident situation, a considerable portion of the weight of such elements used for releasing the active headrest—in particular of the energy store—nevertheless being able to be accommodated in the lower part of the backrest, so that a relatively small tilting moment is produced in the case of an accident. Moreover, it is advantageously possible, as a result, that an actuating path of approximately any length may be implemented for releasing and/or for pushing out the active headrest into its pushed-out setting (adapted to an accident situation), although the movement of the backrest and/or the movement of the shell structure relative to the entire vehicle seat is relatively small in an accident situation and also has to be relatively small due to the relatively small overall depth of the backrest.

According to the invention, it is further preferred that the release device has a lever which may be pivoted about the axis of rotation. According to the invention, for example, in the lower part of a backrest according to the invention with a particularly small overall depth, which has a shell structure and which is connected to a frame structure in a manner having a certain flexibility, it is provided to arrange a joint and/or a lever arrangement such that a variable inclination and/or loading of the shell structure of the backrest of the vehicle seat leads to a variable joint adjustment and/or a variable lever adjustment and/or to a variable pivoting angle of the lever. By such an arrangement, according to the invention, it is possible in a simple manner to produce both a very small overall depth of the backrest and also to achieve a release of an active headrest in the event of a rear crash. The provision of a lever advantageously provides the possibility that the lever may be movable both in a comfort range i.e. in a range of normal use of the vehicle seat, and also in the pivoting angular range of actuation, namely for providing a flexibility of the vehicle seat and/or of the backrest and/or of the shell structure of the vehicle seat which produces comfort and for releasing the energy store. In this case, the pivoting angular range of actuation corresponds to only one part of the total movement range of the lever. Alternatively, however, the lever may also only be moved in the case of a (rear) accident (and then for releasing the energy store), so that the pivoting angular range of actuation corresponds to the entire movement range of the lever.

The following preferred variants may be implemented in both embodiments.

It is particularly preferable that the vehicle seat comprises a transmission device, in particular a Bowden cable, the transmission device being provided for transferring an actuating force from the energy store to the active headrest. As a result, a very advantageous weight ratio and/or a very advantageous weight path within the vehicle seat may be achieved, in the sense of a relatively low weight in the upper part of the backrest. Moreover, as a result, the actuating force may be transferred in a reliable manner from the energy store to the active headrest.

Moreover, it is preferred according to the invention that the backrest is provided to be pivotable about an axis of rotation for the inclination adjustment. As a result, the vehicle seat according to the invention may be used instead of conventionally-used vehicle seats with an inclination-adjustable backrest.

According to a further preferred embodiment of the present invention, it is provided that the release device in a normal operating situation of the vehicle seat effects the blocking of the energy store and in an accident situation effects the release of the energy store.

Moreover, according to the invention, it is preferably provided that the release device effects the release of the energy store only in a rear accident situation. As a result, advantageously reference may be specifically made to various accident situations.

Moreover, it is also preferred that an actuation of the release device, effecting the release of the energy store, is provided due to a relative movement of the seat shell with regard to the vehicle seat. As a result, the elasticity of the seat shell may be advantageously used for the releasing movement. The relative movement of the seat shell with regard to the vehicle seat may preferably take place due to a force of inertia exerted by the seat occupant.

Moreover, it is preferred according to the invention that the energy store is provided as a tension spring or as a compression spring. As a result, according to the invention it is advantageously possible to provide a plurality of types of actuation.

DRAWINGS

Exemplary embodiments of the invention are shown in the drawings and described in more detail in the following description.

FIGS. 1 to 3 show in this connection a second exemplary embodiment and FIGS. 4 to 7 show a first exemplary embodiment.

FIG. 1 shows a first embodiment of a release device and an energy store in a lower part of a backrest according to the invention and/or of a vehicle seat according to the invention in a normal operating situation of the vehicle seat (with the blocked energy store).

FIG. 2 shows the first embodiment of the release device and of the energy store in (or after) an accident situation of the vehicle seat (with the released energy store).

FIG. 3 shows a second embodiment of a release device and of an energy store in a lower part of a backrest according to the invention and/or of a vehicle seat according to the invention in a normal operating situation of the vehicle seat (with the blocked energy store).

FIGS. 4 and 5 show schematically a headrest in a side view (FIG. 4) and a front and/or rear view (FIG. 5) according to the first exemplary embodiment of the present invention.

FIGS. 6 and 7 show schematically two different embodiments of an actuating device to be provided in the region of the backrest, for the actuation of the active headrest for a vehicle seat according to the first exemplary embodiment of the present invention.

DETAILED DESCRIPTION

The figures represent by way of example and schematically two embodiments of the invention. The backrest shown in FIGS. 1 to 3 corresponds in its principal construction to the embodiment disclosed in the German patent application DE 10 2005 021 482 A1.

The figures represent by way of example and schematically two embodiments of the invention. The backrest shown in FIGS. 1 to 3 corresponds in its principal construction to the embodiment disclosed in the German patent application DE 10 2005 021 482 A1.

FIGS. 1 to 3 represent by way of example and schematically various embodiments of the invention according to the second exemplary embodiment, the backrest 10 (and/or the lower part of the backrest) in its principal design corresponding to the embodiment disclosed in the German patent application DE 10 2005 021 482 A1. Such a vehicle seat with a backrest according to the invention is shown schematically, indicated in the upper part of FIG. 1 in a side view.

The seat part (only indicated in the upper part of FIG. 1) of the vehicle seat comprises in a conventional manner a metal structure, in particular made of welded sheet steel. A backrest inclination adjuster (not shown) arranged in the rear region of the metal structure is connected to the projecting and/or free ends of a U-shaped frame part of the backrest 10 such that the backrest 10 may be angularly adjusted relative to the seat part. In the region of the axis of the backrest inclination adjuster a transverse tube 6 (defining an axis of rotation 6) is arranged through the backrest 10. In the front region of the backrest a seat shell 7 is arranged. According to the second embodiment, a lever 8' may be connected to the seat shell 7 and/or according to the second embodiment a lever 8' may be present on the seat shell 7 which is provided to be rotatable about the transverse tube 6.

According to both embodiments (both FIGS. 1 and 2 and also FIG. 3) a release device 8 for an energy store 9, in particular a pretensioned spring, is connected to the seat shell 7. In the left-hand part of FIG. 1, the state of the first embodiment is shown without the release of the energy store 9. In this connection, the release device 8 is arranged relative to the energy store 9 such that the energy store 9 is not released in the case of normal operating situations, in particular movements of the seat occupant in the normal comfort range. As a result, no tensile and/or actuating force is transmitted to a transmission device 11, in particular a Bowden cable, which is able to actuate the active headrest (only shown in the upper part of FIG. 1) and/or to transfer said headrest into a safety position. In the right-hand part of FIG. 1, the state of the first embodiment is shown after releasing the energy store 9. The seat shell 7 has been moved, for example, by a rear accident so that the release device 8 has performed a movement of such a type that the blocking of the energy store 9 is canceled and, for example, a spring force is transmitted as a tensile force or as a compressive force from the energy store 9 to the transmission device 11 and thus the active headrest is actuated. The measure according to the invention has as a substantial advantage that almost any actuating length is available for actuating the active headrest and this actuating length does not substantially depend on the particular size and/or movements of the seat shell 7 in the event of an accident.

According to the second embodiment shown schematically in FIG. 3 of a backrest 10 of a vehicle seat according to the invention it is provided that the lever 8' is either part of the release device 8 or cooperates therewith. For example, by means of the release device 8 a rotation of the lever 8' may be detected or a rotation of the lever 8' by a minimum angle may be detected, the release of the energy store 9 taking place subsequently thereto (i.e. when rotating the lever 8' further). In particular, the lever 8' may be provided to be movable in a first pivoting angular range (not shown) for comfort purposes about the axis of rotation 6—without effecting a release of the energy store 9—and also may be provided to be movable about the axis of rotation 6 in a pivoting angular range of actuation—a release of the energy store 9 taking place.

In all embodiments of the second exemplary embodiment of the present invention, release devices 8, for example, are provided according to the invention as disclosed in the European Patent EP 0 491 744 B1. The disclosure of this document is thus made with reference to the present patent application.

In FIG. 4 an active headrest 20 is shown schematically in a side view and in FIG. 5 an active headrest 20 is shown according to a front and/or rear view according to the first exemplary embodiment of the present invention. The headrest 20 is attached to a backrest 10, not shown, for the first exemplary embodiment and, in particular, provided to be height-adjustable and/or tiltable and/or adjustable in another manner for the purposes of the comfort of a user. The active headrest 20 is, moreover, able to be adjusted into a safety position, so that the vehicle occupant is protected in an accident situation—in particular in the event of a rear accident. In the active headrest 20, the adjustment of the safety position takes place by means of an energy store 9 which is shown schematically in FIG. 4, indicated as a spring. Such an energy store 9 is, for example, configured as a mechanical compression spring or tension spring and moves a front part of the active headrest in the direction of the rear of the head of the seat occupant, i.e. generally to the front. The energy store 9 is tensioned during normal operation. Only in the event of an accident is the energy store 9 released. To this end, a release device 8 is provided, namely a blocking device, which prevents the movement of the active headrest 20 to the front (i.e. into its safety position) during normal operation of the active headrest 20, and is only shown in FIG. 5. According to the first exemplary embodiment of the invention, it is provided, in particular, that both the energy store 9 and the release device 8 are arranged in the headrest 20, and for actuating the active headrest 20, i.e. for releasing the release device (and/or for unblocking the release device) a signal is transmitted from an actuating device 12 shown in FIGS. 6 and 7. This signal transmission may take place according to the invention, in particular, in the form of a force signal and/or a pulse signal from the actuating device 12 via a transmission device 11 to the release device 8. The actuating device 12 comprises according to the first exemplary embodiment of the present invention, in particular, a pair of articulated levers 13 (embodiment according to FIG. 6) or more than one pair of articulated levers 13, in particular two pairs of articulated levers (embodiment according to FIG. 7). An impact of the body of a seat occupant on an impact element shown to the left in FIGS. 6 and 7, effects a lengthening of the transmission element 11 (in particular, a Bowden cable 11) which leads to the signal transmission to the release device 8 and thus to the actuation of the active headrest.

The invention claimed is:

1. A vehicle seat comprising: a backrest, an active headrest, a release device, and an energy store, wherein during a normal operating situation of the vehicle seat the energy store is blocked by the release device, and during an accident the energy store is released by the release device for actuation of the active headrest, the backrest comprises an actuating device, the release device is arranged in the active headrest, a transmission device is arranged between the actuating device and the release device, and the actuating device is an articulated lever arrangement provided for actuating the transmission device and comprising two pairs of articulated levers.

2. A vehicle seat comprising a backrest, the backrest comprising a shell structure, a release device connected to the shell structure, and an energy store, wherein during a normal operating situation of the vehicle seat the energy store is blocked by the release device, and during an accident the energy store is released by the release device for actuation of an active headrest, and actuation of the release device, effecting the release of the energy store, is due to a relative movement of the shell structure relative to the vehicle seat resulting from an inertial force exerted by a seat occupant;
wherein the vehicle seat comprises a transmission device for transferring an actuating force from the energy store to the active headrest, and the transmission device comprises a Bowden cable.

3. The vehicle seat as claimed in claim 2, wherein the energy store comprises a compression spring.

4. The vehicle seat as claimed in claim 2, wherein the release device comprises a lever pivotable about an axis of rotation.

5. The vehicle seat as claimed in claim 2, wherein the backrest is pivotable about an axis of rotation for inclination adjustment.

6. The vehicle seat as claimed in claim 2, wherein the release device effects the release of the energy store only in a rear accident situation.

7. The vehicle seat as claimed in claim 2, wherein the energy store comprises a tension spring.

8. The vehicle seat as claimed in claim 1, wherein the release device effects the release of the energy store only in a rear accident situation.

9. The vehicle seat as claimed in claim 1, wherein the energy store comprises a tension spring.

10. The vehicle seat as claimed in claim 1, wherein the energy store comprises a compression spring.

* * * * *